Oct. 23, 1962 — W. D. CHAMBERS — 3,059,315
BURNISHING TOOL FOR COUNTERBORE RADII
Filed Dec. 2, 1960
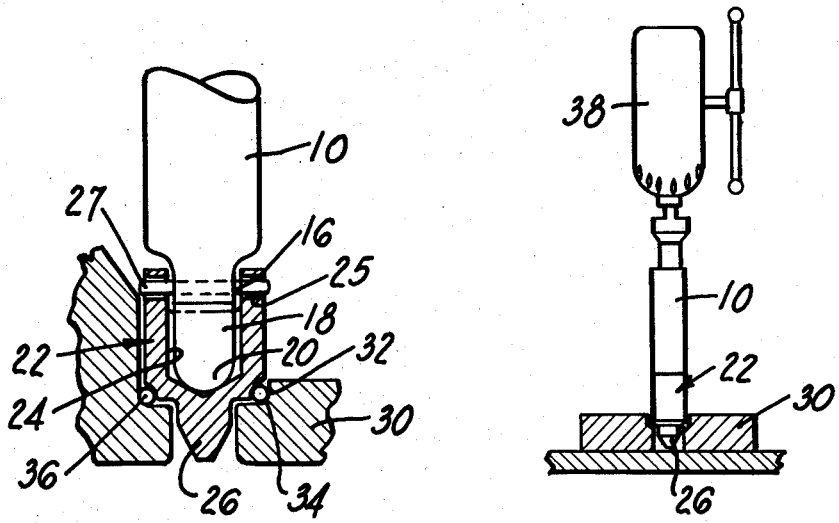
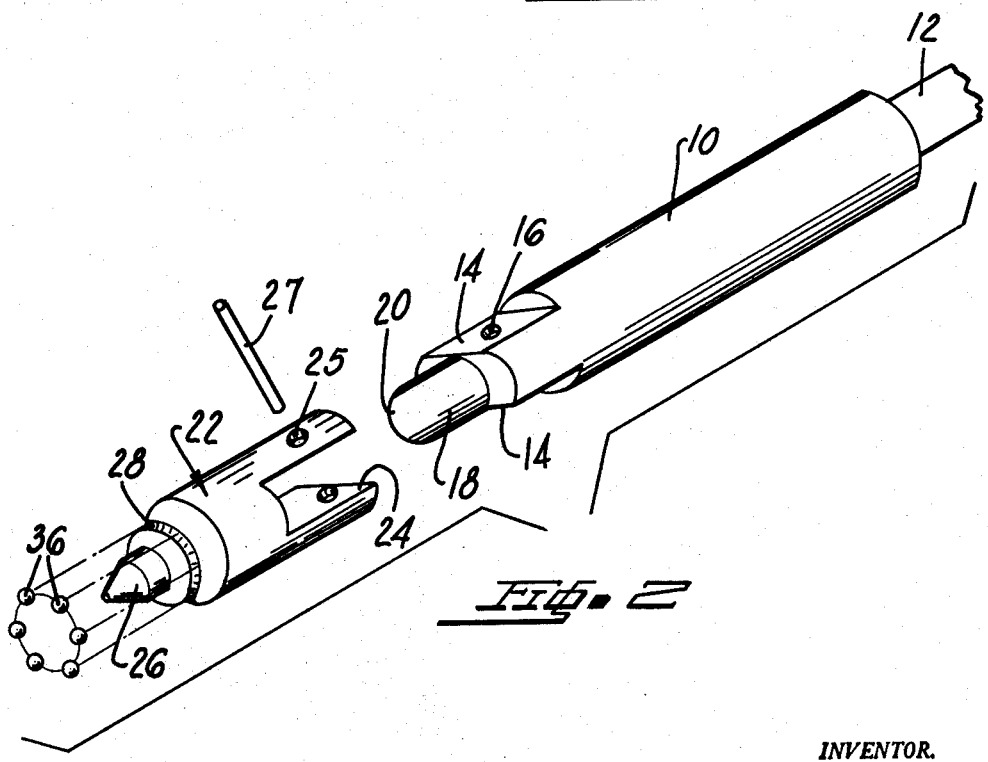
INVENTOR.
WARREN D. CHAMBERS
BY
*William S. Thompson*
AGENT United States Patent Office 3,059,315
Patented Oct. 23, 1962

3,059,315
BURNISHING TOOL FOR COUNTERBORE RADII
Warren D. Chambers, South Bend, Ind., assignor to The
Bendix Corporation, a corporation of Delaware
Filed Dec. 2, 1960, Ser. No. 73,408
4 Claims. (Cl. 29—90)

The present invention relates to burnishing tools and more particularly a tool for burnishing a radial fillet of a counterbore in a workpiece.

The primary object of the invention is to provide a burnishing tool that is adapted to burnish or cold work the radii or fillets in a countersunk hole to increase the fatigue life of a workpiece such as for example cast or forged wheels having a plurality of countersunk bolt receiving holes which are subject to alternating stresses with each rotation of the wheel.

Other objects and advantages of the present invention will become apparent on consideration of the following specification read in conjunction with the accompanying drawings, wherein:

FIGURE 1 is a section view taken through the center of my burnishing tool which is illustrated in operative engagement with a workpiece.

FIGURE 2 is an exploded isometric view of my burnishing tool to better illustrate a preferred configuration of the parts; and FIGURE 3 is a side elevation view showing one arrangement of my burnishing tool with driving means and workpiece.

Referring to FIGURES 1 and 2 numeral 10 designates a driving member formed as a generally cylindrical rod over the greater portion of its length and having a reduced diameter portion 12 at one end. Portion 12 is generally adaptable to be received in a collet or other similar rotary driven tool holder. At the opposite or lower end of driving member 10 there is formed opposing "flats" or single plane sides 14. Approximately at the center of the flats 14 a transverse bore 16 extends through the driving member. A further, second, reduced diameter portion 18 having a spherically contoured end 20 projects further downwardly to form the lower terminal portion of driving member 10. The burnishing tool proper is designated generally by numeral 22 and is formed to have a first hollow cylindrical or tubular body portion 24 and a second smaller diameter portion 26, partly cylindrical and partly conical at the lower end thereof. The diameter of the interior bore of cylindrical portion 24 is sized to freely admit the terminal portion of driving member 10 and further said bore is tapered at its lower end in the preferred embodiment of my device. Further, the upper end of tool 22 is slotted, as best seen in FIGURE 2, to receive flats 14 of the driving member 10. A bore 25 is formed through the upper end of tool 22 and is located so as to be in alignment with bore 16 of driving member 10 when the parts are assembled. Pin 27 is provided to loosely engage burnishing tool 22 and driver 10. A portion of the outer surface of tool 22, located at 28, is formed generally conical to provide an inclined surface at the lower end of the first hollow cylindrical portion 24. Referring particularly to FIGURE 1, my burnishing tool 22 and driver 10 are arranged in a working position with a workpiece 30 having a countersunk hole 32 and an interior radial fillet 34 susceptible to fatigue failure. A series of hardened balls 36 are interposed between the radial fillet 34 and inclined plane surface 28.

In FIGURE 3 my burnishing tool and driver assembly are arranged in working position with a drill press head 38 which represents one suitable driving means which may be used with the burnishing tool of the present invention. It should be understood that other driving heads may be readily used with my device and it has been found that the quality of cold worked surface will be greatly improved by accurate control of the tool applying force. One highly suitable type of force applying means is disclosed in my copending application Serial No. 719,538, filed March 6, 1958, now Patent 2,977,669 issued April 4, 1961, entitled "Apparatus for Roll Burnishing Aircraft Wheels and the Like."

OPERATION

The driving member 10 is received in the hollow interior bore of burnishing tool 22 and is loosely held in position by pin 27 so that on withdrawal of the driving member from the workpiece after an operation is completed, tool 22 will likewise be withdrawn. The hemispherical end 20 of driving tool 10 bears against the tapered end of the interior bore of tool 22 to provide angular self-alignment of the burnishing tool with the counterbore area. In this respect the hemispherical end and tapered end contact operates somewhat like a universal joint connection in that the driving member and burnishing tool are relatively movable in an angular direction with respect to one another, yet rotational movement may be transmitted from the driver to the burnishing tool. Flats 14 rotate into engagement with the slotted portion of the bore in burnishing tool 22 as driver 10 is rotated to transmit rotary movement to tool 22. Hardened balls 36, preferably fabricated from steel, are forced to roll up the inclined plane or conical surface 28 thereby expanding to fill the counterbore radius 34 in workpiece 30. As driver 10 and tool 22 rotate, this causes balls 36 to roll around radius 34 under the applied load thus cold working the surface. Balls 36 may be held to the burnishing tool 22 by magnetizing the tool, however, in applications where viscous lubricating or machining fluids are used it may be desirable to cage the balls in a retainer in the manner that well known ball bearings are caged in a race, except that such a retainer must be slotted to permit the balls to roll up the inclined plane 28. The second smaller portion 26 of the burnishing tool 22 operates as a pilot to guide the tool into the workpiece 30.

While I have shown and described what I consider to be the preferred embodiment of my invention, it is to be understood that such changes in construction, design and materials as come within the scope of the appended claims may be resorted to without departing from the spirit of my invention.

I claim:

1. A rotary burnishing tool comprising a body member having a closed and an open end, said closed end having a conically contoured external surface area and an internal conical surface area coaxial of said external surface area, a plurality of spherical members supported on said external surface area, an elongated driving member having a rounded end surface disposed within said open end of said body with said rounded end engaged with said internal conical surface, and said elongated driving member including means transmitting rotary motion to said body member.

2. A tool as claimed in claim 1 wherein said body member and said driving member have aligned transverse bores and are loosely joined by a pin member projecting through said aligned bores.

3. A tool as claimed in claim 1 wherein said body member has a pilot portion projecting from said closed end.

4. A tool as claimed in claim 1 wherein said spherical members are supported on said extending surface area by magnetic means.

(References on following page)

References Cited in the file of this patent

UNITED STATES PATENTS

| | | |
|---|---|---|
| 577,973 | Whittemore | Mar. 2, 1897 |
| 845,730 | Marshall | Feb. 26, 1907 |
| 2,390,651 | Iseman | Dec. 11, 1945 |
| 2,541,455 | Anderson | Feb. 13, 1951 |

FOREIGN PATENTS

| | | |
|---|---|---|
| 253,763 | Switzerland | Mar. 31, 1948 |
| 400,532 | Great Britain | Oct. 26, 1933 |
| 591,146 | Germany | Jan. 17, 1934 |
| 678,070 | France | Dec. 23, 1929 |
| 692,468 | Germany | June 20, 1940 |